United States Patent
Shikama (10) Patent No.: US 11,628,505 B2
(45) Date of Patent: Apr. 18, 2023

(54) DRILLING TOOL

(71) Applicant: TUNGALOY CORPORATION, Fukushima (JP)

(72) Inventor: Hiroya Shikama, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 0 days.

(21) Appl. No.: 17/360,882

(22) Filed: Jun. 28, 2021

(65) Prior Publication Data
US 2022/0001465 A1    Jan. 6, 2022

(30) Foreign Application Priority Data
Jul. 3, 2020    (JP) .............................. JP2020-115750

(51) Int. Cl.
*B23B 51/06*    (2006.01)
*B23B 51/00*    (2006.01)

(52) U.S. Cl.
CPC ........ *B23B 51/066* (2022.01); *B23B 51/0682* (2022.01); *B23B 51/0007* (2022.01); *B23B 2251/56* (2013.01)

(58) Field of Classification Search
CPC .............. B23B 51/066; B23B 51/0682; B23B 2251/56; B23B 51/0007
See application file for complete search history.

(56) References Cited

U.S. PATENT DOCUMENTS

| | | | | |
|---|---|---|---|---|
| 1,304,981 A * | 5/1919 | Hoagland | ............... | B23B 51/06 408/57 |
| 2,418,021 A * | 3/1947 | Fleischer | ............ | B23B 51/0486 408/59 |
| 2,606,464 A * | 8/1952 | Fleischer | ............... | C01G 25/04 408/59 |
| 2,739,496 A * | 3/1956 | Fleischer | ............ | B23B 51/0486 408/233 |
| 2,882,765 A * | 4/1959 | Andreasson | ........ | B23B 51/0486 408/59 |

(Continued)

FOREIGN PATENT DOCUMENTS

DE    2317568 A1 * 10/1974
JP    S54-028087 A    3/1979
(Continued)

*Primary Examiner* — Eric A. Gates
(74) *Attorney, Agent, or Firm* — Studebaker & Brackett PC (57) ABSTRACT

A drilling tool is provided, which is configured to prevent an insufficient chip discharge ability thereof. The drilling tool includes a cutting insert having a cutting edge at a leading end portion, and a body to which the cutting insert is mounted. The drilling tool also includes a recessed part provided on an outer peripheral surface of the body and extending to a leading end of the body, and an oil supply port provided on a base end side of the recessed part and supplying cutting oil, passing through the inside of the body, to an outer peripheral side of the body. In a case where the drilling tool further includes a guide pad that comes into abutment with an inner wall surface of a hole cut by the cutting insert, and a fastening screw for fixing the guide pad to the body, the oil supply port may be provided at a position further toward the base end side of the body than a position of the fastening screw.

7 Claims, 9 Drawing Sheets

(56) References Cited

U.S. PATENT DOCUMENTS

| | | | | |
|---|---|---|---|---|
| 4,092,083 | A | * | 5/1978 | Larry .................. B23B 51/0486 408/59 |
| 7,004,691 | B2 | * | 2/2006 | Nomura ................ B23B 31/113 408/229 |
| 2010/0135739 | A1 | * | 6/2010 | Nomura .............. B23B 51/0493 408/199 |
| 2011/0008116 | A1 | | 1/2011 | Nomura |
| 2011/0033255 | A1 | | 2/2011 | Nomura |
| 2019/0176249 | A1 | * | 6/2019 | Shiota ..................... B23B 51/00 |

FOREIGN PATENT DOCUMENTS

| | | |
|---|---|---|
| JP | S60-094412 U | 6/1985 |
| JP | 2009-226560 A | 10/2009 |
| JP | 2019-104102 A | 6/2019 |

* cited by examiner

DRILLING TOOL

BACKGROUND

Field

The present invention relates to a drilling tool.

Description of Related Art

A gun drill with a replaceable blade edge has been used as a drilling tool for cutting a deep hole (see JP2019-104102A as a Patent Document 1 set forth below, for example).

A conventional gun drill with a replaceable blade edge is configured to carry a coolant to the bottom of a hole (oil hole) inside a body through the hole, cause the coolant that has bounced off the bottom of the hole to pass through a chip discharge groove (flute), and thereby carry the chips to the outside of the hole.

Patent Document 1: JP2019-104102A

SUMMARY

However, in the structure described above, since the speed of the coolant becomes infinitely low at a time when the coolant hits the bottom of the hole and the oil hole inevitably has to be extremely small, insufficient chip discharge ability is elicited, especially in drills with small diameters (such as approximately Φ14 [mm] or less).

An object of the present invention, therefore, is to provide a drilling tool that is configured to prevent an insufficient chip discharge ability thereof.

One aspect of the present invention is a drilling tool including: a cutting insert having a cutting edge at a leading end portion; and a body to which the cutting insert is mounted, the drilling tool further including: a recessed part provided on an outer peripheral surface of the body and extending to a leading end of the body; and an oil supply port provided on a base end side of the recessed part and supplying cutting oil, passing through an inside of the body, to an outer peripheral side of the body.

Since the drilling tool according to this aspect has a structure in which the oil supply port is disposed on the base end side of the recessed part, a hole diameter (opening area) of the oil supply port can easily be made larger. Enlarging the oil supply port makes it easy to resolve the insufficient chip discharge ability pertaining to the prior art.

The drilling tool described above may further include a guide pad coming into abutment with an inner wall surface of a hole cut by the cutting insert, and a fastening screw that fixes the guide pad to the body, wherein the oil supply port may be provided at a position further toward a base end side of the body than a position of the fastening screw.

The oil supply port of the drilling tool described above may be provided at a position further toward the base end side than the guide pad.

The oil supply port of the drilling tool described above may be provided at a position in which a distance between a part of the oil supply port and a base end of the guide pad is within 1 mm.

In the drilling tool described above, the oil supply port and the recessed part may be connected to each other.

In the drilling tool described above, at least a part of the recessed part may be adjacent to the guide pad.

In the drilling tool described above, the recessed part may extend along an axial direction.

In the drilling tool described above, the recessed part may be provided on a forward side of a rotation direction of the drilling tool when viewed from the guide pad.

In the drilling tool described above, the recessed part and the oil supply port may be provided in plurality.

In the drilling tool described above, the recessed part may have a cross-sectional area larger than an opening area of the oil supply port.

The drilling tool described above may have an outer diameter of equal to or less than Φ12 [mm].

The drilling tool described above may be a tool with a replaceable blade edge that is configured such that the cutting insert is removable therefrom.

BRIEF DESCRIPTION OF DRAWINGS

FIGS. 3A to 3C show a result of an analysis of a flow of cutting oil in the drilling tool according to the embodiment of the present invention, where FIG. 3A is a perspective view schematically showing a structure of said drilling tool, FIG. 3B a perspective conceptual drawing schematically showing a structure of an analysis model, and FIG. 3C an analytical image showing a flow rate of the cutting oil;

FIGS. 4A to 4C show a reference drawing of a result of an analysis of a flow of cutting oil in a drilling tool having a conventional structure, where FIG. 4A is a perspective conceptual drawing schematically showing an internal structure, FIG. 4B a perspective conceptual drawing schematically showing a structure of an analysis model, and FIG. 4C an analytical image showing a flow rate of the cutting oil;

FIGS. 5A and 5B show the drilling tool according to the embodiment of the present invention, where

FIGS. 6A and 6B show the drilling tool having the conventional structure, where

FIGS. 8A to 8D show, as a reference, a result of an analysis of the flow velocity vector of the cutting oil in the drilling tool (side groove type) according to the embodiment of the present invention, where FIGS. 9A to 9D show, as a reference, a result of an analysis of flow velocity vector of the cutting oil in the drilling tool (leading end hole type) having the conventional structure, where

DETAILED DESCRIPTION

A preferred embodiment of a drilling tool according to the present invention is described hereinafter in detail with reference to the drawings.

A drilling tool 1 of the present embodiment is a tool used for processing a deep hole. The drilling tool 1 includes a body 10, an oil supply port 17, an oil groove (recessed part) 18 and the like, and rotates about a rotational axis 10 to drill a hole in a work material. The drilling tool 1 is a tool with a replaceable blade edge to/from which a cutting insert 60 can be attached/detached (removed), wherein the cutting insert 60 having a cutting edge 62 is mounted onto a leading end 10A of the body 10 (see FIG. 1 and the like).

Figure 1:
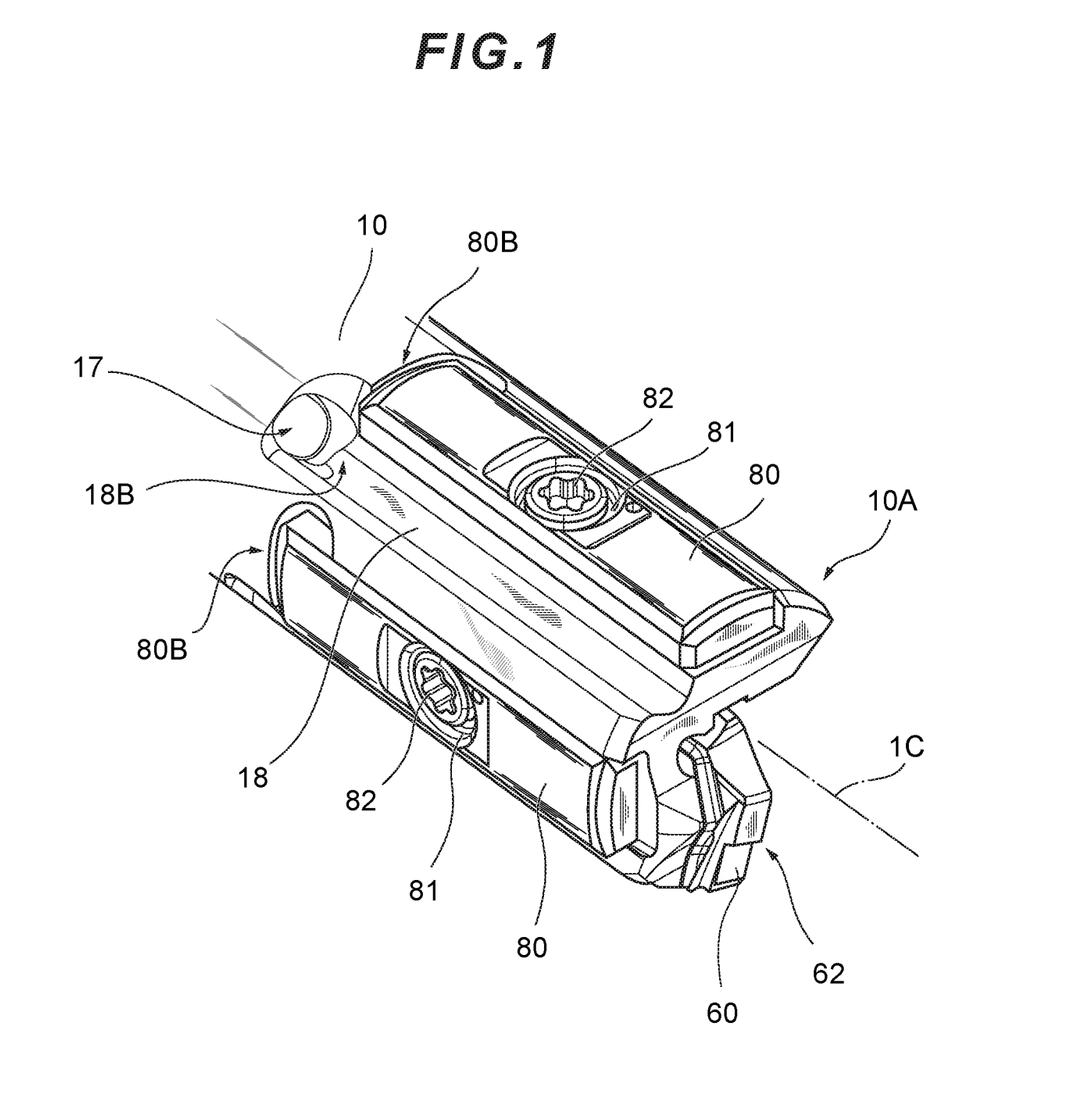
FIG. 1 is a perspective view showing structures of a body and the like of a drilling tool according to an embodiment of the present invention.
Figure 2:
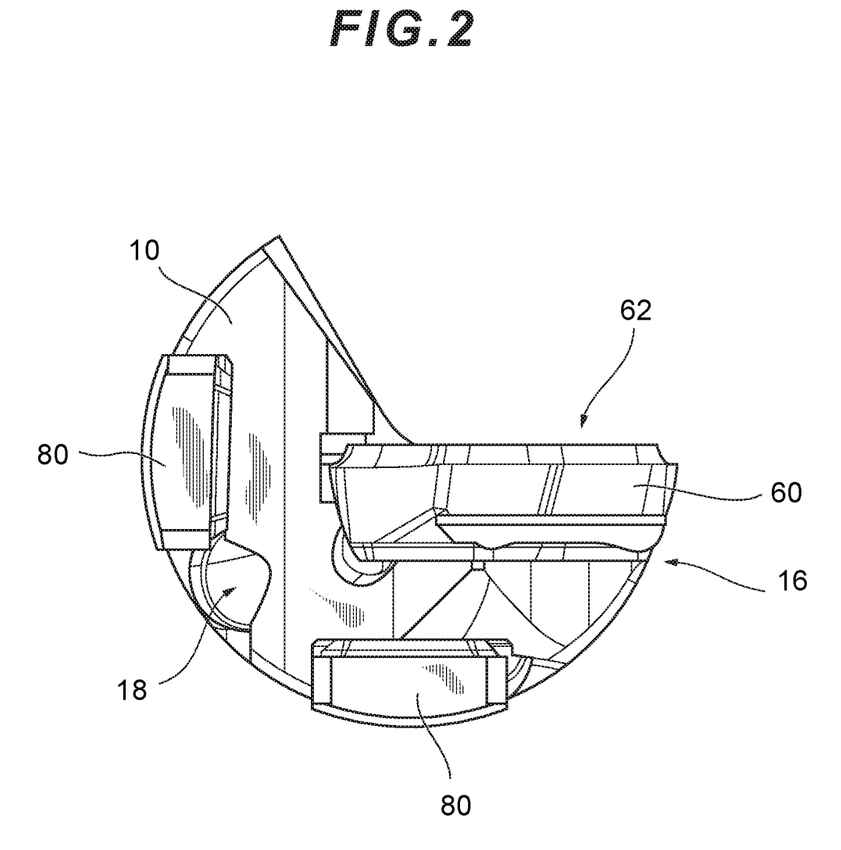
FIG. 2 is a diagram showing the body of the drilling tool from a leading end side along an axial direction.
Figure 5A:
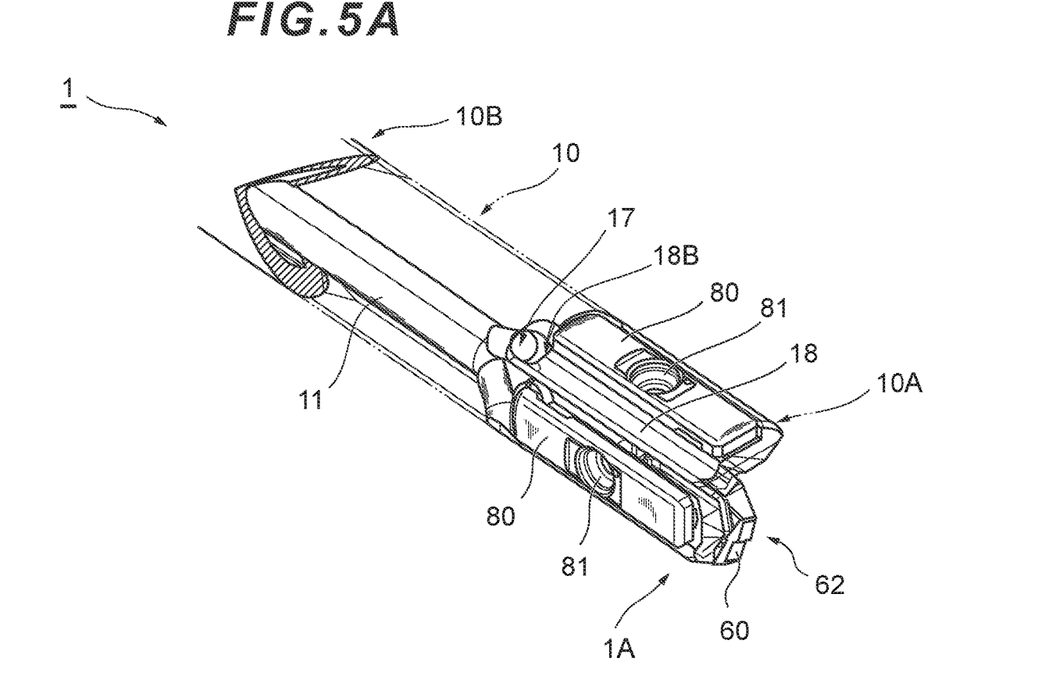
FIG. 5A is a perspective conceptual drawing showing a schematic outline of an internal structure of said drilling tool.
Figure 5B:
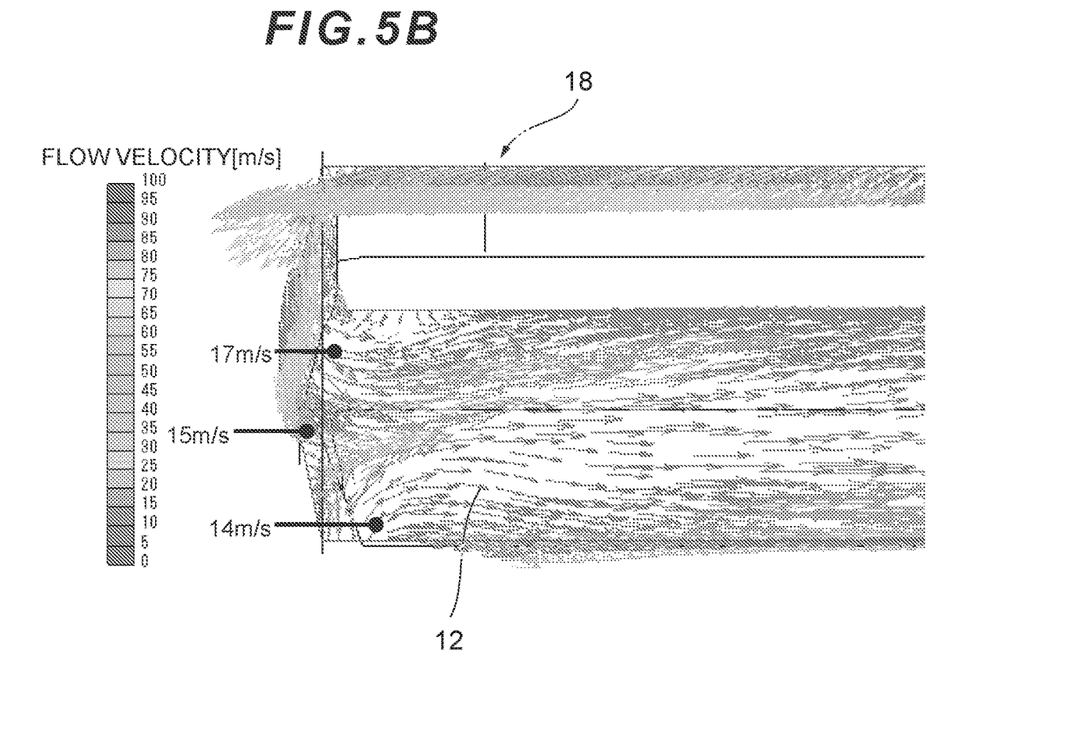
FIG. 5B is an analytical image showing a result of an analysis of the flow rate of the cutting oil.
Figure 6A:
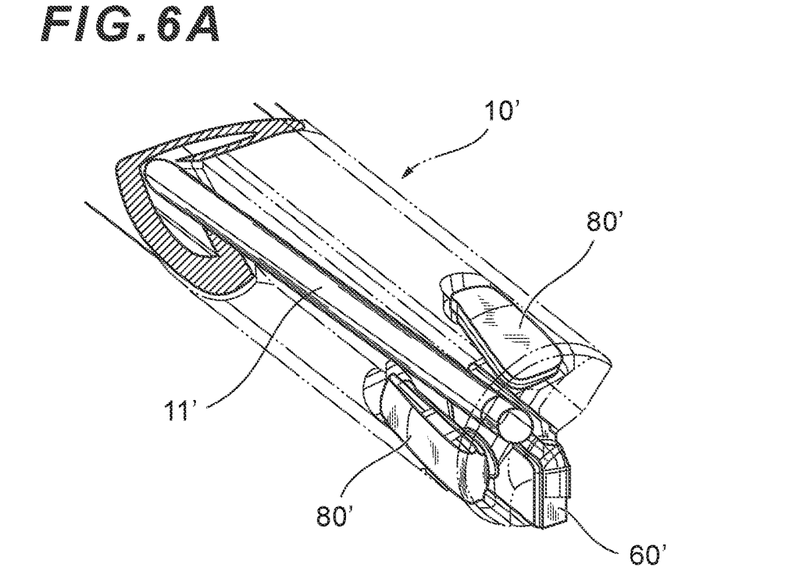
FIG. 6A is a perspective conceptual drawing showing a schematic outline of an internal structure of said drilling tool.
Figure 6B:
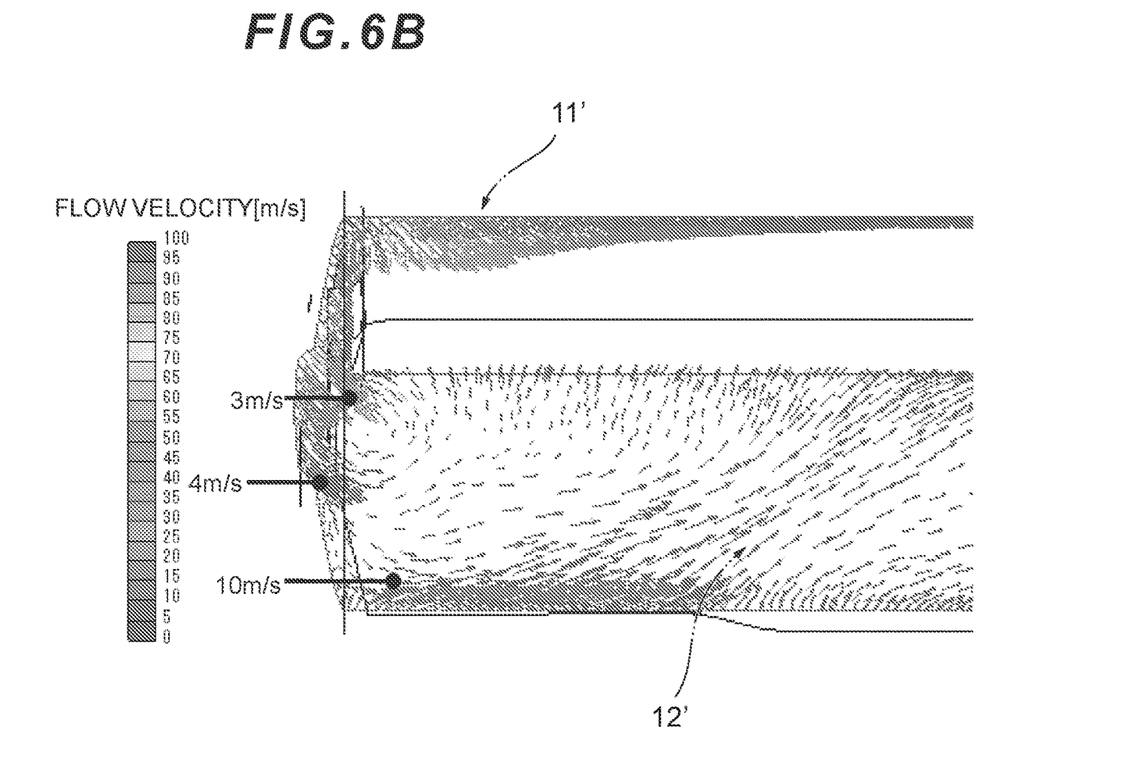
FIG. 6B is a reference drawing of a perspective view showing an internal structure of the analytical image showing the result of the analysis of the flow rate of the cutting oil.
Figure 7A:
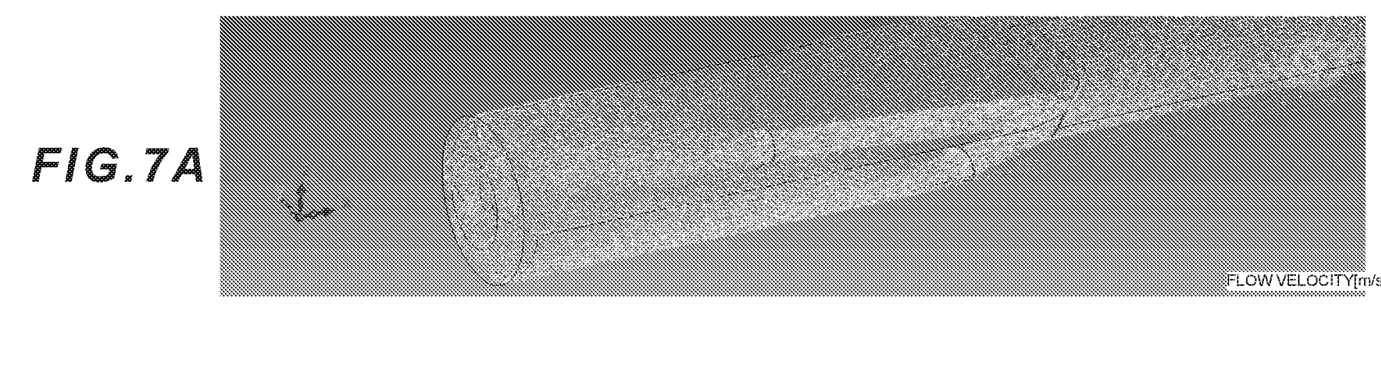
FIG. 7A is an analytical image showing a result of an analysis of a flow velocity vector of the cutting oil in the analysis model of the drilling tool.
Figure 7B:
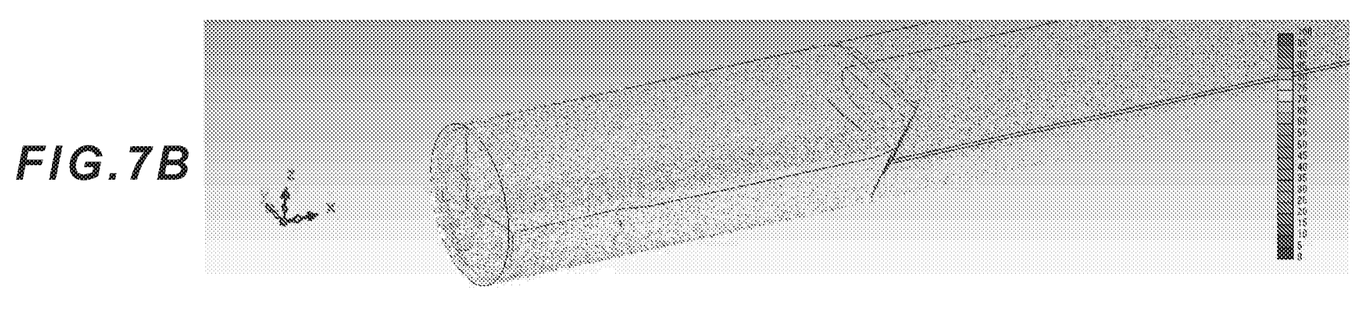
FIG. 7B is an analytical image showing, as a reference, a result of an analysis of a flow velocity vector of the cutting oil in the analysis model of the drilling tool having the conventional structure.
Figure 8A:
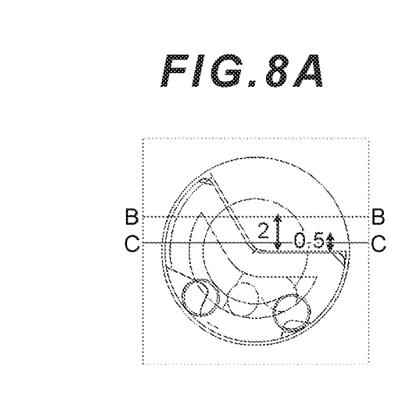
FIG. 8A is a diagram showing the drilling tool from the leading end side along the axial direction.
Figure 8B:
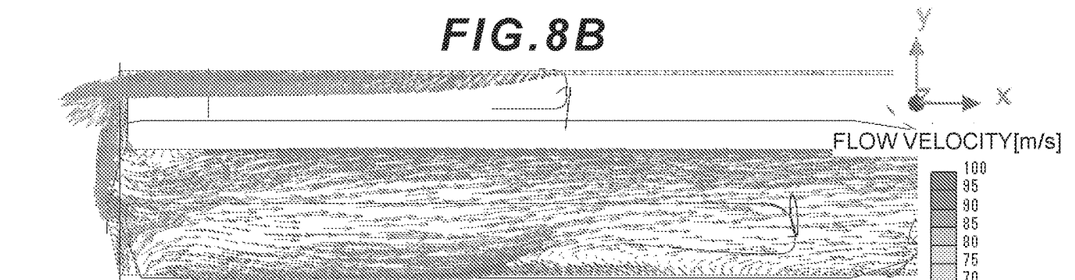
FIG. 8B is an image showing an analysis of the flow velocity vector of the cutting oil in a plane B-B of FIG. 8A.
Figure 8C:
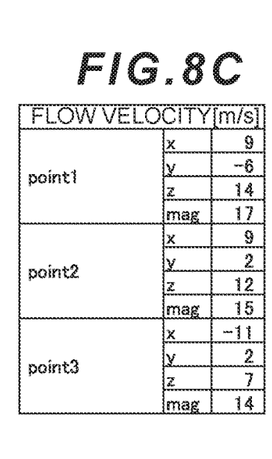
FIG. 8C is an image showing an analysis of the flow velocity vector of the cutting oil in a plane C-C.
Figure 8D:
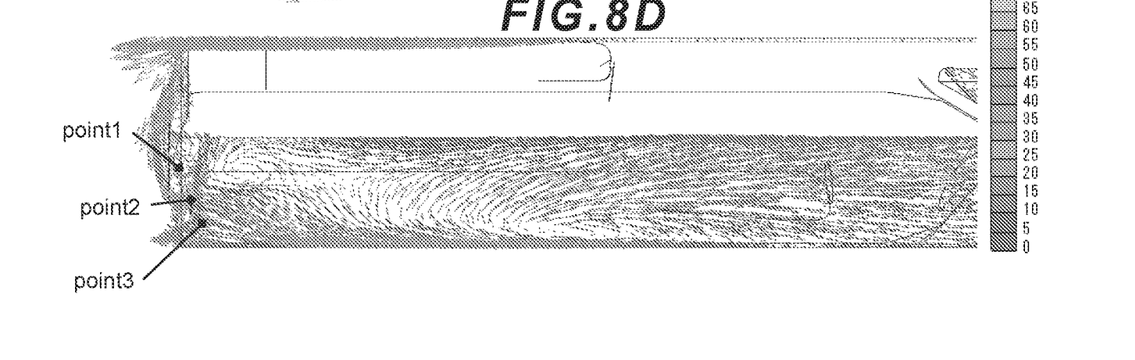
FIG. 8D is a table showing the flow velocities in x, y, and z directions at respective points 1 to 3 in the plane C-C.
Figure 9A:
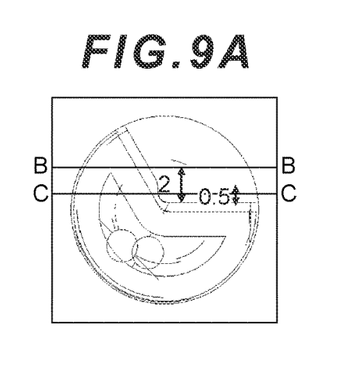
FIG. 9A is a diagram showing the drilling tool from a leading end side along the axial direction, FIG. 9B an image showing an analysis of the flow velocity vector of the cutting oil in a plane B-B of FIG. 9A, FIG. 9C an image showing an analysis of the flow velocity vector of the cutting oil in a plane C-C, and FIG. 9D a table showing the flow velocities in the x, y, and z directions at the respective points 1 to 3 in the plane C-C.
Figure 9B:
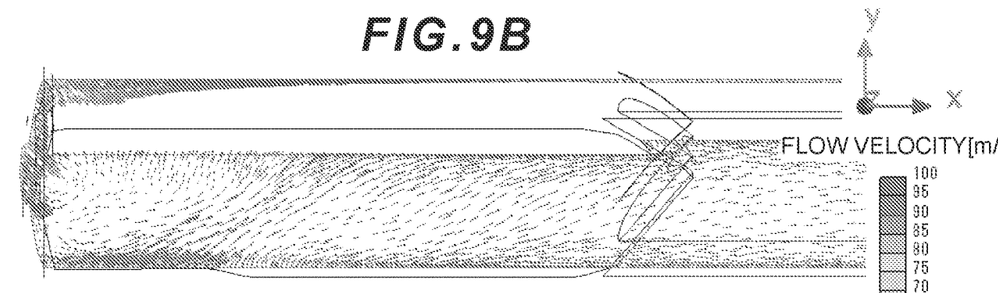
Figure 9C:
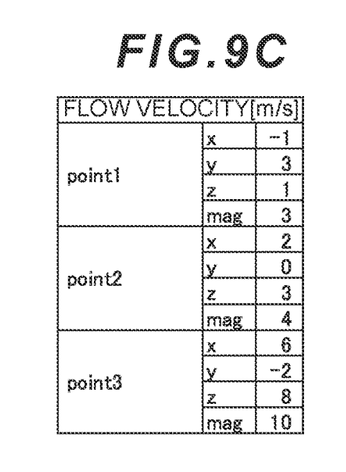
Figure 9D:
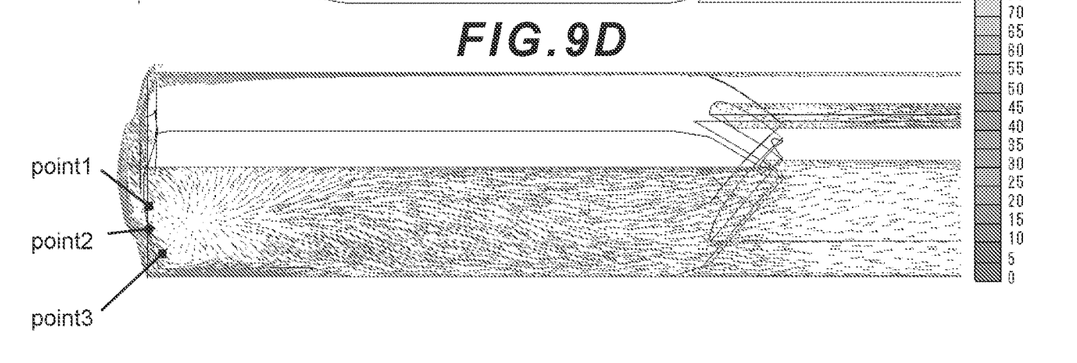

The body 10 is a rod-shaped member made of a metallic material, extending from a base end 10B toward the leading end 10A along the rotational axis 10 of the drilling tool 1 (see FIGS. 1, 5A, 5B and the like). The rotational axis 1C is a virtual straight line serving as a center of rotation of the drilling tool 1, and passes through a center of the body 10. A discharge flow path 12, a mounting seat 16, the oil supply port 17, and the oil groove (recessed part) 18 are formed in the body 10 of the present embodiment. Also, a guide pad 80 is mounted onto a side portion (outer peripheral portion) of the body 10 (see FIG. 2 and the like).

The discharge flow path 12 is a flow path for discharging chips that are generated in drilling of a hole in the work material using the drilling tool 1 (see FIGS. 5A, 5B and the like). In the present embodiment, the discharge flow path 12 in a hollow shape is formed inside the body 10, to guide chips generated at a leading end portion 1A of the drilling tool 1 toward a base end portion thereof.

The mounting seat 16 is a seat for mounting the cutting insert 60. In the body 10 of the present embodiment, the mounting seat 16 is provided at the leading end 10A of the body 10 (see FIG. 2 and the like). The cutting insert 60 is mounted on a predetermined position of the mounting seat 16 by a mounting screw 64.

The oil supply port 17 is a port for injecting cutting oil (which also functions as a coolant) supplied from the base end portion side of the drilling tool 1. A tubular cutting oil supply path (indicated by reference numeral 11 in the drawing) is formed inside the body 10, and the cutting oil injected from the oil supply port 17 to the outer peripheral side through the cutting oil supply path is supplied toward the leading end portion 1A side through the oil groove (recessed part) 18.

The oil groove 18 is a groove for guiding the cutting oil injected from the oil supply port 17 and supplying the cutting oil toward the leading end portion 1A side. The oil groove 18 of the present embodiment is formed on an outer peripheral surface of the body 10 by a recessed part that is provided in such a manner as to extend from the oil supply port 17 to the leading end 10A of the body 10 (see FIG. 1 and the like).

The guide pad 80 is a member that comes into abutment with an inner wall surface of a hole of the work material cut by the cutting insert 60, to function as a guide. The guide pad 80 is mounted and fixed to the side portion (outer peripheral portion) of the body 10 by a fastening screw 82 (see FIG. 1 and the like). In the present embodiment, the body 10 is provided with two guide pads 80 (see FIG. 2 and the like).

In the drilling tool 1 of the present embodiment, the oil supply port 17 is provided at a base end 18B side of the oil groove 18 (see FIG. 1 and the like). In a case where the oil supply port 17 is disposed on the base end 18B side of the oil groove 18, a larger hole diameter (opening area) of the oil supply port 17 can be secured easily. The oil supply port 17 and the oil groove 18 are connected in such a manner that the cutting oil injected from the oil supply port 17 flows into the oil groove 18 smoothly (see FIG. 1 and the like). In the present embodiment, a flow path cross-sectional area of the oil groove 18 is made larger than the opening area of the oil supply port 17 so that the cutting oil flows into the oil groove 18 more smoothly.

From the viewpoint of securing a larger hole diameter (opening area) of the oil supply port 17, the oil supply port 17 is preferably provided at a position further toward the base end side of the body 10 than the positions of the fastening screws 82, and more preferably provided at a position further toward the base end side than the guide pads 80 (see FIG. 1 and the like). For example, in a case where the guide pads 80 are fixed with the respective fastening screws 82 so as to be replaceable, if the cutting oil supply path is stretched to the leading end portion 1A, the hole diameter is limited so that the cutting oil supply path does not interfere with screw holes 81 for the guide pads 80 (see FIGS. 4A to 4C, 6A and 6B). On the other hand, such interference of the cutting oil supply path with the screw holes 81 can be avoided by forming the oil supply port 17 at the base end side from the screw holes 81, thereby obtaining a large hole diameter. Although the same interference may occur with the mounting screw 64 for mounting the cutting insert 60 and a screw hole thereof, the drilling tool 1 of the present embodiment can solve such interference.

By forming the oil supply port 17 on the side surface of the body 10 at the base end side of the guide pads 80 having the sufficient space as described above, the oil supply port 17 can be made relatively large, and such problem as a deterioration in chip discharge ability can be resolved. A specific position of the oil supply port 17 with respect to the guide pads 80 and a clearance therebetween are not particularly limited. However, in the present embodiment, for example, the oil supply port 17 is provided at a position where the gap (shortest distance) between a part of the oil supply port 17 and a base end 80B of each guide pad 80 is equal to or less than 1 mm.

Specific shape and arrangement of the oil groove 18 are not particularly limited. However, as long as at least a part of the oil groove 18 is provided adjacent to the guide pads 80, the guide pads 80 can be cooled by the cutting oil flowing through the oil groove 18, thereby extending the life of the guide pads 80. In the present embodiment, the oil groove 18 in a linear shape is provided so as to extend along the axial direction of the drilling tool 1, and the entire oil groove 18 is configured to be in contact with the guide pads 80 (see FIG. 1 and the like). In this case, the effect of cooling the guide pads 80 with the cutting oil flowing through the oil groove 18 can be further improved.

In addition, the oil groove 18 may be provided on a forward side of the rotation direction of the drilling tool 1 when viewed from the guide pad 80. In the present embodiment, the oil groove 18 is provided on a forward side of a counterclockwise rotation direction (a position in front of the guide pad 80) of the drilling tool 1 when viewed from the guide pad 80, the drilling tool 1 rotating counterclockwise when viewed from the leading end portion 1A side (see FIG. 2 and the like). In this case, the effect of cooling the guide pad 80 with the cutting oil flowing through the oil groove 18 can be further improved.

The drilling tool 1 of the present embodiment described above can construct a structure that prevents a deterioration in chip discharge ability. In other words, in conventional drilling tools (for example, gun drills), the fact that the speed of the coolant drops as soon as the coolant hits the bottom of the hole, and the fact that the oil hole is extremely small, lead to insufficient chip discharge ability, especially in drills with small diameters (see FIGS. 4A to 4C, 6A and 6B); such configuration is not suitable for small-diameter tools (the outer diameters of existing products are, for example, at least, $\Phi 18$ [mm] or more). On the other hand, the drilling tool 1 of the present embodiment is configured to be able to discharge chips smoothly, even with a relatively small oil pressure, by increasing a flow velocity of the coolant in the vicinity of the flute or blade edge and by securing a larger oil hole (oil supply port 17) in a small space. Accordingly, the drilling tool 1, such as a gun drill that is required to have an outer diameter of equal to or greater than a certain outer diameter ($\Phi 18$ or more, for example) in order to ensure chip dischargibility, can be configured to have a smaller diameter (for example, an outer diameter range of $\Phi 12$ or less) while ensuring rigidity. By providing a plurality of the guide pads 80 (for example, two, in the present embodiment), the foregoing structure according to the present embodiment becomes especially effective when applied to the drilling tool 1 in which the space for the oil supply port cannot be secured easily.

Examples

Figures 3A, 3B:
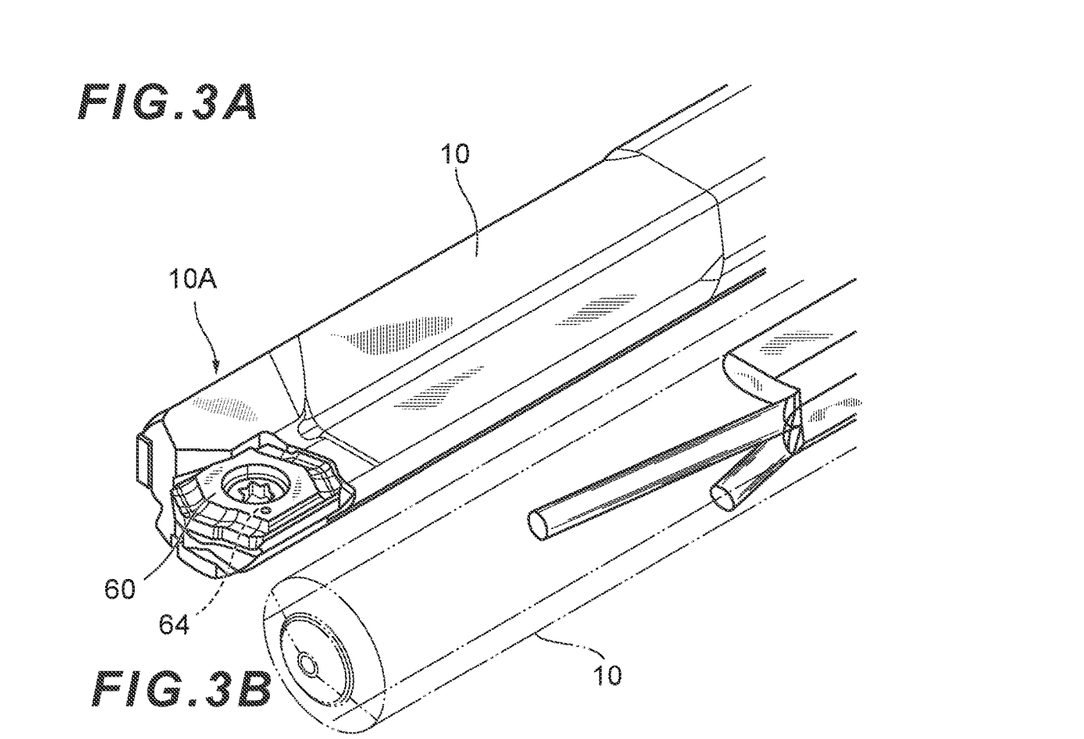
Figure 3C:
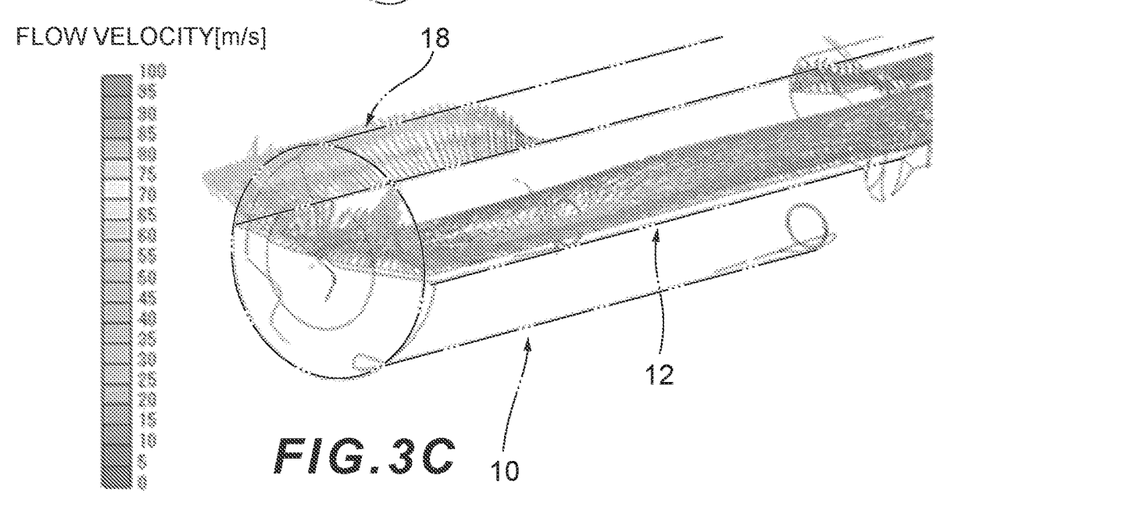
Figures 4A, 4B:
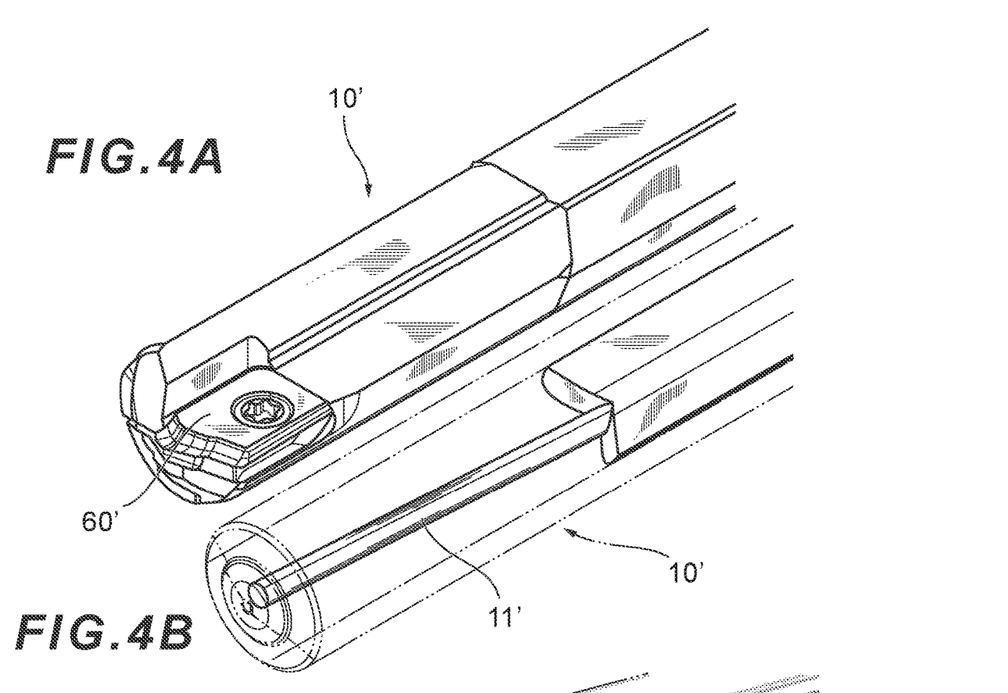
Figure 4C:
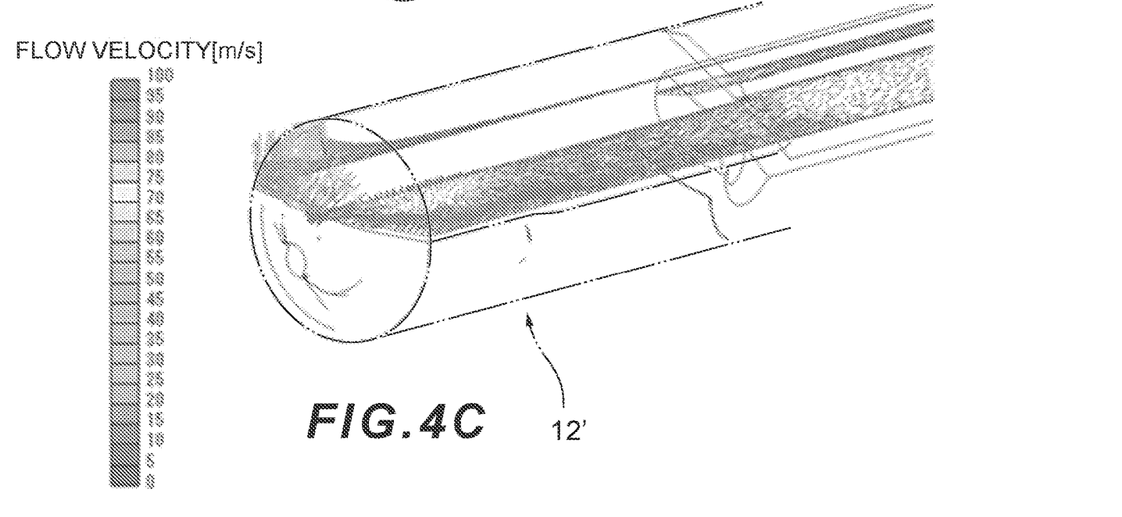

Fluid analysis result for the gun drill-type drilling tool 1 with a replaceable blade edge having the structure according to the present embodiment are now described hereinafter as examples, while comparing said results with those of the conventional structure (reference example) (see FIGS. 3A to 3C and the like). In the reference example showing the conventional structure, members corresponding to those of the drilling tool 1 of the present embodiment are shown by adding apostrophes (') to the same reference numerals. Since the fluid analysis results shown in FIGS. 3A to 3C, 4A to 4C, 5A, 5B, 6A, 6B, 7A, 7B, 8A to 8D, and 9A to 9D were created on the basis of data containing color information, some parts may not sufficiently reflect color differences. However, it is understood that the differences with the conventional structure and the advantages of the present embodiment are fully understood from the lengths, shadings, and densities of flow velocity vectors, as well as numerical data shown in the drawings.

A flow of the cutting oil in the drilling tool 1 having the structure according to the present embodiment was analyzed (see FIGS. 3A to 3C, 5A and 5B) and compared with a flow of cutting oil in the drilling tool having the conventional structure (see FIGS. 4A to 4C, 6A and 6B). According to these results, it was confirmed that, in the drilling tool 1 of the present embodiment, the flow velocity in the flow path for facilitating discharge of chips was large because attenuation of the flow can be reduced. A minimum machining oil pressure (a minimum oil pressure that enabled drilling as a result of a cutting machining experiment is referred to as "minimum machining oil pressure" in the present specification) was 5.0 MPa with a water-insoluble fluid in the conventional structure, and 3.5 MPa with a water-insoluble fluid in the present embodiment.

The flow velocity vector of the cutting oil in the drilling tool 1 having the structure according to the present embodiment was analyzed (see FIGS. 7A and 8A to 8D) and compared with the flow velocity vector of the cutting oil in the drilling tool having the conventional structure (see FIG. 7B) and the flow velocity vector of cutting oil of a leading end hole type drilling tool (see FIGS. 9A to 9D) (the drilling tool 1 of the present embodiment is of a side groove type). According to these results, it was confirmed that, in the drilling tool 1 of the present embodiment, the flow velocity in the axial direction (x direction) was nearly twice as fast as that of the conventional structure. Moreover, in the conventional leading end hole type, the oil hole (an opening of a cutting oil supply path 11') is opened on a leading end surface, and the flow velocity and the flow rate of the cutting oil are limited because the gap is narrow, and as a result, the direction of the cutting oil was forcibly changed drastically by the work material in the vicinity of the blade edge immediately after the cutting oil left the cutting oil supply path 11' of the tool. On the other hand, in the side groove type drilling tool of the present embodiment, since the distance to the blade edge is long, it was confirmed that the direction of the flow of the cutting oil was changed slowly. In addition, in the side groove type drilling tool of the present embodiment, since a cutting oil outlet (the oil supply port 17) is opened at the position closer to the base end side compared to the conventional type, and the cutting oil is guided to the leading end portion 1A by the oil groove 18, it was confirmed that the flow velocity and the flow rate of the cutting oil can be increased.

Note that the embodiment described above is a preferred example of the present invention, but the present invention is not limited thereto, and various modifications can be made without departing from the gist of the present invention. For example, the present embodiment has described the drilling tool 1 that is provided with one oil supply port 17 and one oil groove (recessed part) 18 (see FIG. 1 and the like). However, such configuration is merely an example; needless to say, a plurality of the oil supply ports 17 and a plurality of the oil grooves (recessed parts) 18 may be provided.

Furthermore, although the oil groove (recessed part) 18 described in the present embodiment has a uniform cross section (see FIG. 1 and the like), the cross-sectional shape of the oil groove 18 does not need to be constant. For example, the oil groove 18 may be shaped so as to expand toward the leading end portion 1A from the oil supply port 17, or conversely, may be shaped so as to taper as in a nozzle.

Also, the configuration described in the present embodiment in which the drilling tool 1 is viewed from the leading end side thereof along the axial direction (see FIG. 2) is also merely an example; relative angles and arrangements of the cutting edge 62, the guide pads 80 and the like can be changed as appropriate.

The present invention is suitable for application to drilling tools, especially gun drills for drilling deep holes having small diameters.

What is claimed is:

1. A drilling tool comprising: a cutting insert having a cutting edge at a leading end portion; and a body to which the cutting insert is mounted, the drilling tool further comprising:

a recessed part provided on an outer peripheral surface of the body and extending to a leading end of the body;

an oil supply port provided on a base end side of the recessed part and supplying cutting oil, passing through an inside of the body, to an outer peripheral side of the body;

a guide pad coming into abutment with an inner wall surface of a hole cut by the cutting insert; and a fastening screw for fixing the guide pad to the body, wherein the oil supply port is provided at a position further toward a base end side of the body than a position of the fastening screw and further toward the base end side of the body than a base end of the guide pad, and at least a part of the recessed part comes into contact with the guide pad.

2. The drilling too according to claim 1, wherein the oil supply port is provided at a position in which a distance between a part of the oil supply port and the base end of the guide pad is within 1 mm.

3. The drilling tool according to claim 1, wherein the oil supply port and the recessed part are connected to each other.

4. The drilling tool according to claim 1, wherein the recessed part extends along an axial direction.

5. The drilling tool according to claim 4, wherein the recessed part is provided on a forward side of a rotation direction of the drilling tool when viewed from the guide pad.

6. The drilling tool according to claim 5, wherein the recessed part has a cross-sectional area larger than an opening area of the oil supply port.

7. The drilling tool according to claim 1, having an outer diameter of equal to or less than 12 mm.

* * * * *